(12) United States Patent
Perry et al.

(10) Patent No.: US 6,840,895 B2
(45) Date of Patent: Jan. 11, 2005

(54) TOOL SIDE ROBOTIC SAFETY INTERLOCK

(75) Inventors: Dwayne Perry, Raleigh, NC (US); Richard Heavner, Apex, NC (US)

(73) Assignee: ATI Industrial Automation, Inc., Apex, NC (US)

( * ) Notice: Subject to any disclaimer, the term of this patent is extended or adjusted under 35 U.S.C. 154(b) by 15 days.

(21) Appl. No.: 10/387,279

(22) Filed: Mar. 12, 2003

(65) Prior Publication Data

US 2004/0180769 A1 Sep. 16, 2004

(51) Int. Cl.[7] .............................................. B23Q 3/155
(52) U.S. Cl. ................................ 483/1; 483/7; 483/10; 483/901; 483/16; 700/179
(58) Field of Search ............................. 483/901, 7, 10, 483/2, 1, 4, 13, 12; 700/179; 901/41; 318/568.13, 568.11

(56) References Cited

U.S. PATENT DOCUMENTS

| | | | | |
|---|---|---|---|---|
| 3,663,998 A | * | 5/1972 | Cupler, II | 483/54 |
| 3,667,114 A | * | 6/1972 | Smith et al. | 483/5 |
| 3,783,253 A | * | 1/1974 | Anderson et al. | 700/179 |
| 4,398,136 A | * | 8/1983 | Tanaka | 483/7 |
| 5,018,266 A | * | 5/1991 | Hutchinson et al. | 483/1 |
| 6,116,966 A | * | 9/2000 | Little et al. | 439/700 |
| 6,491,612 B1 | * | 12/2002 | Kurup et al. | 483/16 |
| 6,533,594 B1 | * | 3/2003 | Kurup | 439/197 |

* cited by examiner

*Primary Examiner*—A. L. Wellington
*Assistant Examiner*—Dana Ross
(74) *Attorney, Agent, or Firm*—Coats & Bennett, P.L.L.C.

(57) ABSTRACT

A robotic tool changer with an improved safety interlock includes a master unit, a tool unit, and a coupler movable between coupled and decoupled positions and operative to couple the master and tool units. A circuit for actuating the coupler is associated with the tool unit, for connection to an interlock that closes when the tool is safely parked in a tool stand. The circuit enables the coupler to assume the decoupled position when the master and tool units are coupled and the circuit is closed. The robotic tool changer additionally includes a circuit operative to enable the coupler to assume the decoupled position when the master unit is decoupled from the tool unit.

29 Claims, 4 Drawing Sheets

TOOL SIDE ROBOTIC SAFETY INTERLOCK

BACKGROUND OF THE INVENTION

The present invention relates generally to the field of robotics and specifically to a safety interlock provided on the tool side of a robotic tool changer.

Industrial robots have become an indispensable part of modem manufacturing. Whether transferring semiconductor wafers from one process chamber to another in a cleanroom or cutting and welding steel on the floor of an automobile manufacturing plant, robots perform many manufacturing tasks tirelessly, in hostile environments, and with high precision and repeatability.

In many robotic manufacturing applications, it is cost-effective to utilize a relatively generic robot to accomplish a variety of tasks. For example, in an automotive manufacturing application, a robot may be utilized to cut, grind, or otherwise shape metal parts during one production run, and perform a variety of spot welding tasks in another. Different welding tool geometries may be advantageously mated to a particular robot to perform welding tasks at different locations or in different orientations. In these applications, a tool changer is used to mate different tools to the robot. One half of the tool changer, called the master unit, is permanently affixed to a robot arm. The other half, called the tool unit, is affixed to each tool that the robot may utilize. When the robot arm positions the master unit adjacent the tool unit connected to a desired tool, a coupler is actuated that mechanically locks the master and tool units together, thus affixing the tool to the end of the robot arm. Utilities such as electrical current, air pressure, hydraulic fluid, cooling water, electronic or optical data signals, and the like, may be transferred through the robot changer from the master unit to the tool unit via mating terminals, valve connections, electrical connectors, and the like, making the utilities available to the selected tool.

Safety is of paramount concern in any industrial robotic application. To prevent possible injury or damage to the tool, it is imperative that a tool not come dislodged from a robot arm to which it is coupled until the robot arm has positioned the tool in a tool stand or similar receptacle designed to safely support and store the tool. Since the only part of the robot arm and tool assembly not typically bolted together is the coupler of the tool changer, design and control of the coupler are key concerns. The coupler of a tool changer, i.e., the mechanism that selectively couples and decouples master unit and tool units, may comprise an electromechanical, hydrologic, pneumatic, or similar construction. Tool changers and their constituent couplers are well known in the robotics arts, and are commercially available, such as from the assignee, ATI Industrial Automation of Apex, North Carolina.

Although it may assume a wide variety of shapes, sizes, and modes of operation, a coupler is typically designed in a fail-safe manner, with its default state being coupled. That is, if power or pneumatic pressure is interrupted or a command interface is terminated, the master and tool units remain coupled together. This may be accomplished, for example, by spring-biasing the coupler to the coupled position, and requiring the positive application of electrical power, pneumatic pressure, or the like, to move it to the decoupled position. Also, control of the coupler during operation is carefully controlled, with robot control software typically performing myriad checks such as consulting sensors, shutting down utilities, removing applied power from the tool, and the like, prior to issuing a decouple command to the tool changer.

Typically, commands to actuate the coupler to couple or decouple the tool changer units are generated by a controller, which is typically located in the master unit. In modern robotic tool changers, this controller may conform to the DeviceNet specification promulgated by the Open DeviceNet Vendor Association (ODVA), information on which is available from odva.org. Alternatively, the controller may comply with other bus system specifications, or may be a custom-designed unit. Regardless of the specific controller, the generation and transmission of decouple commands is typically carefully controlled so as not to be inadvertently generated, causing untimely decoupling of the tool from the robot arm. Nevertheless, due to fear of software glitches, human error, and the like, it is desirable to interpose a hardware safety interlock into the decoupling circuit.

One example of such a safety interlock known in the art comprises physically breaking the connection that energizes the decoupling circuit upon command by the controller, and bringing the open circuit to external contacts on the tool changer. These contacts may then be connected to a switch located on the exterior of the tool unit or the tool itself, in such a position and manner that the switch contacts are closed by the tool stand when the tool is placed in the tool stand and securely supported. This closes the circuit, allowing the decouple signal generated by the controller to pass through the closed switch and reach the coupler, decoupling the master and tool units and removing the tool from the robot arm. When the tool is in any position other than safely stowed in its tool stand, the switch contacts remain open, and any decouple signal generated by the controller cannot reach the coupler to effect the decouple operation.

Prior art implementations located these switch contacts on the exterior of the master unit (which typically houses both the coupler and the controller), with a switch attached that extended to the vicinity of the tool, to be closed by the tool stand. In practice, this has been found to be a deficient solution. For example, it has been proven difficult to design and implement a switch on the master unit that is operative with a variety of tools, due to the different geometries that each tool presents. It has been discovered that in many applications, personnel simply connect a short-circuit connector to the contacts, thus thwarting the safety benefit of the interlock.

Moving the interlock contacts to the tool unit (by, for example, passing the unlock signal path between the master and tool units via inter-tool-changer utility connections) alleviates the necessity of a universal tool interlock switch design. Since each tool unit is typically permanently attached to a particular tool, a switch that fits the geometry of the tool may easily be designed and attached to the tool unit or to the tool itself. However, such a relocation introduces a problem: when the master and tool units are decoupled, as described above, the default position of the coupler is the coupled position. The coupler must move to the decoupled position to be able to mate the master unit with a tool unit. Yet the circuit to actuate the coupler is broken, and, regardless of the position of the tool-mounted switch, the circuit cannot be closed until the master and tool units are mated together and the utility contacts complete the circuit from the controller in the master unit, through the switch mounted on the tool, back to the coupler in the master unit.

SUMMARY OF THE INVENTION

The present invention relates to a robotic tool changer with an improved safety interlock. The tool changer includes a master unit, a tool unit, and a coupler movable between coupled and decoupled positions and operative to couple the master and tool units. The tool changer also includes a circuit for actuating the coupler, including contacts associated with the tool unit and operative to enable the coupler to assume the decoupled position when the contacts are connected, and a switch operative to enable the coupler to assume the decoupled position only when the master unit is decoupled from the tool unit.

DETAILED DESCRIPTION OF THE INVENTION

Figure 1:
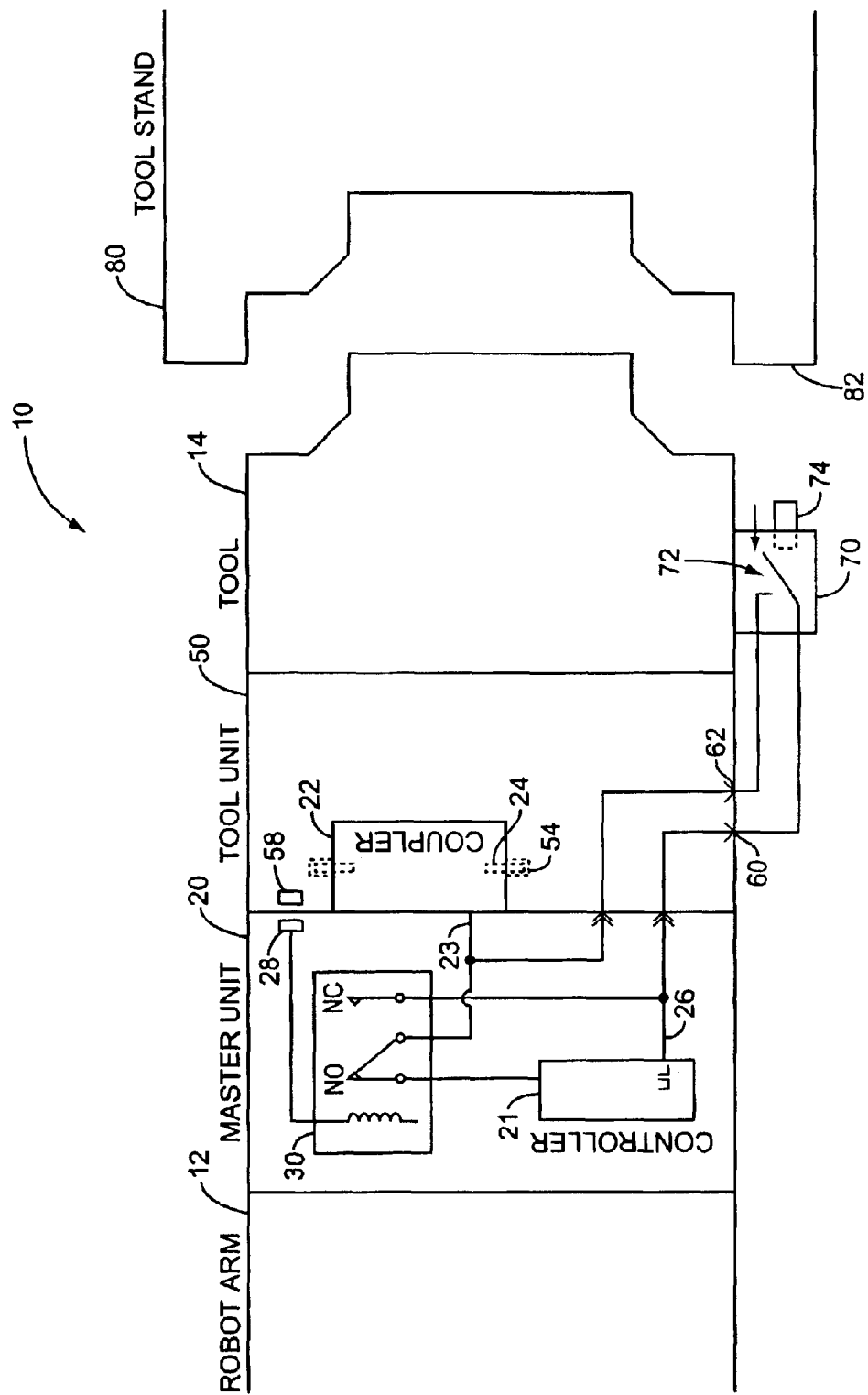
FIG. 1 is a functional block diagram of a tool changer, with the master and tool units coupled and the tool removed from the tool stand.
Figure 2:
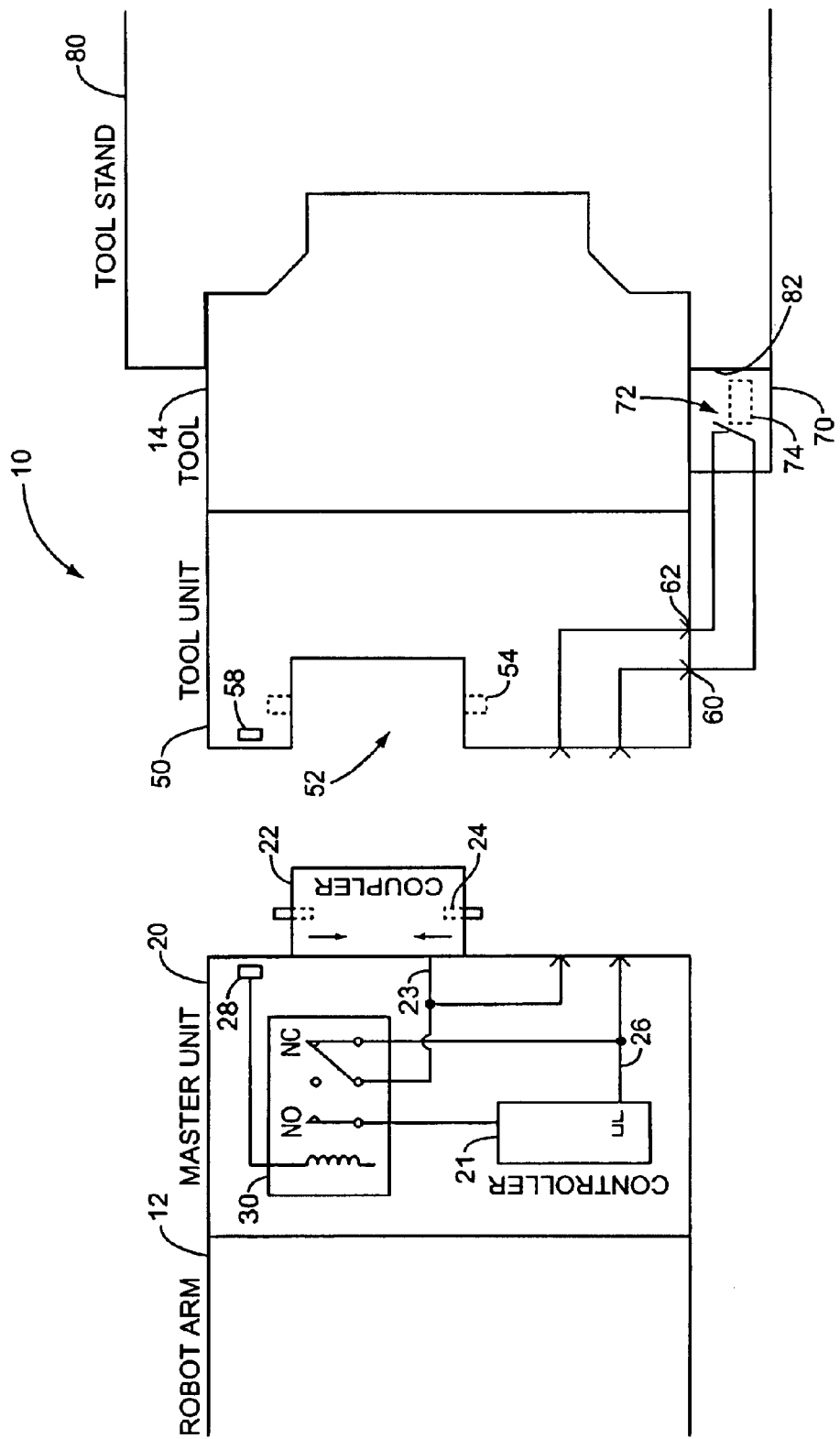
FIG. 2 is a functional block diagram of a tool changer, with the tool mounted in a tool stand and the master and tool units decoupled.

The present invention relates to a robotic tool changer with an inventive tool safety interlock circuit. FIGS. 1 and 2 both depict, in functional block diagram form, one implementation of the tool changer of the present invention, in different configurations. Like parts are numbered consistently between the figures, and both figures should be referred throughout the following discussion. It should be noted that the tool safety interlock depicted in FIGS. 1 and 2 comprises electrical circuits. The present invention is not, however, limited to this embodiment, and, as described below, may be implemented in a variety of ways.

The tool changer according to the present invention, indicated generally by the numeral 10, comprises master unit 20 and tool unit 50. The tool changer 10 provides a standard interface for physically coupling a robot arm 12 with a robotic tool 14. The tool changer 10 selectively physically couples the master unit 20 to the tool unit 50, and additionally supplies various utilities from the robot arm 12 to the tool 14, such as high-voltage electricity, pneumatic pressure, fluids, electrical signals, and the like, through mating connections (not shown) between the master unit 20 and the tool unit 50. Details of the tool changer 10 are not presented herein because such details are not per se material to the present invention, and further, tool changers are well known in the art.

To effect selective coupling and decoupling of the master unit 20 and tool unit 50, the master unit 20 includes a coupler 22 (in other embodiments, the coupler 22 may be located on the tool unit 50). In the functional block diagrams of FIGS. 1 and 2, coupler 22 protrudes from the master unit 20, and mates into a corresponding recess 52 in the tool unit 50. When the coupler 22 is located in recess 52, coupling may be achieved by extending retractable protrusions 24 of the coupler 22 into corresponding receptacles 54 formed in the recess 52 of the tool unit 50. The extendable protrusions 24 may, for example, be located radially around the circumference of a circular coupler 22, providing a plurality of generally evenly spaced locking points. FIG. 1 depicts the master unit 20 and tool unit 50 coupled together, with the coupler 22 residing in recess 52, and the extendable protrusions 24 extended into corresponding receptacles 54.

To decouple the master unit 20 from the tool unit 50, such as for example to connect a different tool 14 to the robot arm 12, the extendable protrusions 24 may be retracted into the coupler 22, as depicted by the motion arrows of FIG. 2, allowing the coupler 22 to exit the recess 52.

It should be noted that the coupler 22 of FIGS. 1 and 2 is a functional block diagram, for explanatory purposes only. In practice, tool changer couplers may comprise intricate and complex electro-mechanical or pneumatic systems, and may include a plurality of locking elements, such as ball bearings, cylindrical rollers, or the like, as are known in the robotic arts. Regardless of the complexity of any given implementation of a coupler 22, however, the coupler 22 is typically actuated with one or two command signals. For example, the coupler 22 depicted in FIGS. 1 and 2 assumes a coupled state by default, and assumes a decoupled state upon assertion of an unlock signal from a controller 21 (located, in this example, in or on the master unit 20), That is, the extendable protrusions 24 are spring-loaded or otherwise biased to the extended position, as depicted In both FIGS. 1 and 2. The protrusions 24 only assume the retracted position during the assertion of an unlock signal at the uncouple input 23 of the coupler 22. The unlock signal may, for example, be generated by the controller 21 (denoted "UL"). Such a coupler 22 may, for example, be implemented with the use of electrical solenoids for retractable protrusions 24, as is well known in the art. The solenoids 24 are retracted into the coupler 22 upon application of electrical power, i.e., for the duration of the assertion of the unlock signal. When power is removed, i.e., when the unlock signal is deasserted, the solenoids 24 extend to their protruding positions, as depicted in FIGS. 1 and 2. In other implementations, the coupler 22 may require a separate lock signal from the controller 21 to actuate the coupler 22 into the coupled position. In fact, a wide variety of additional signals may be implemented in any given implementation of a coupler 22; however, where some signal or combination of signals is applied to the coupler 22 to decouple the master unit 20 from the tool unit 50, the tool safety interlock of the present invention is applicable.

The master unit 20 includes controller 21, in wired or wireless communication with a robot control system (not shown). In an exemplary embodiment, controller 21 comprises a DeviceNet controller. In other embodiments, controller 21 may comprise a different standard bus interface, a microprocessor and associated circuits, a custom integrated circuit such as an ASIC or FPGA, or the like. To decouple the master unit 20 from the tool unit 50, controller 21 generates an unlock command signal at its unlock output 26. For a safety interlock, rather than route the unlock command directly to the decouple input 23 of the coupler 22, the unlock output 26 is routed across the master/tool interface, and through the tool unit 50 to an external contact 60. Another external contact 62 on the tool unit 50 carries the return signal through the tool unit, across the master/tool interface, and routes it to the decouple input 23 of the coupler 22. The external contacts 60 and 62 of tool unit 50 may be integrated in a common connector, possibly along with additional signals, as is well known in the art.

FIG. 1 depicts the master unit 20 and tool unit 50 coupled together, which connects the tool 14 to the robot arm 12. To prevent inadvertent decoupling of the master unit 20 from the tool unit 50 (possibly causing the robot arm 12 to drop the tool 14), an interlock switch 70 is mounted on the tool 14, and its switch contacts connected to a circuit in the tool unit 50 comprising external contacts 60 and 62. This circuit connects to the unlock output 26 of the controller 21 and the decouple input 23 of the coupler 22 on the master unit 20, when the master unit 20 and tool unit 50 are coupled together. Interlock switch 70 comprises normally-open electrical contacts 72 and plunger 74, biased to the extended position. As depicted in FIG. 1, during normal operation of the robot, the tool 14 cannot inadvertently be decoupled from the robot arm 12. Even in the event that a software glitch, communications error, erroneous manual input, or the like, causes the controller 21 to erroneously issue an unlock command 26, the corresponding electrical signal will travel across the master/tool interface, to the external contact 60, and to the interlock switch 70. As the interlock switch contacts 72 are maintained in an open-circuit condition, the unlock signal 26 is unable to traverse the return path (i.e., to external contact 62, across the master/tool interface, and to the coupler unlock input 23).

Also depicted in FIG. 1 is a tool stand 80, shaped and configured so as to receive and securely hold the tool 14, when the tool 14 is decoupled from the robot arm 12 by the tool changer 10. As used herein, the term "tool stand" denotes a broad array of tool storage locations. In practice, the tool stand 80 may comprise any appropriate receptacle or holding mechanism for the tool 14, such as a stand, rack, hook or other suspension device, or the like. In the functional diagram depicted in FIG. 1, tool stand 80 includes an actuating surface 82 positioned so as to engage and actuate the interlock switch 70 when the tool 14 is placed in the tool stand 80. As depicted in FIG. 2, the actuating surface 82 depresses the plunger 74, closing electrical contacts 72. This completes the electrical circuit between unlock signal 26 at the controller 21 and the unlock signal 23 at the coupler 22. With the safety interlock switch 70 closed, an unlock command generated by the controller 21 will reach the coupler 22, retracting the plungers 24 and allowing the master unit 20 to decouple from the tool unit 50.

Note that the interlock switch 70 is a functional block diagram only. In practice, the interlock switch 70 may comprise an electromechanical switch as shown, or alternatively may comprise a proximity-operated relay, or any of a broad array of sensors and switches as known in the art, such as for example, ultrasonic, magnetic, optical, radio frequency, capacitive, or other proximity sensors.

Locating the external contacts 60, 62 on the tool unit allows for an interlock switch 70 designed to the geometry of a particular tool 14. The interlock switch 70 may be located on the tool 14, as shown, or alternatively may be located on the tool unit 50, such as directly connecting to external contacts 60, 62, with an appropriate extension placing the plunger 74 or other actuating element in a position to be engaged by surface 82 of the tool stand 80 when the tool 14 is securely housed in the tool stand 80.

Locating the connectors 60, 62 on the tool unit 50 introduces a problem. Referring to FIG. 2, when the tool 14 is secured in the tool stand 80, and the master unit 20 has decoupled from the tool unit 50, the electrical connectivity between the unlock signal 26 at controller 21 and the unlock signal 23 at coupler 22 (established through the interlock switch 70) is broken. As the coupler 22 is of a fail-safe design, whose default position is the coupled position, this causes the retractable plungers 24 to extend to the coupled position. As the robot arm 12 maneuvers to attach to another tool 14, the coupler 22 cannot mate with the recess 52 of the desired tool unit 50, without energizing the unlock signal 23 to actuate the coupler 22 to retract the plungers 24, assuming the decoupled position. To provide an alternate path for the unlock signal 26, the master unit 20 according to the present invention includes a switch 30, depicted in FIGS. 1 and 2 as a relay. In the normally-closed position, which the switch 30 assumes when the master unit 20 and tool unit 50 are decoupled, as depicted in FIG. 2, the relay 30 connects the unlock signal 26 from the controller 21 with the unlock input 23 of the coupler 22. This allows the coupler 22 to assume the decoupled position whenever an unlock command is generated by the controller 21, so long as the master unit 20 and tool unit 50 are decoupled.

FIG. 1 depicts the relay 30 when the master unit 20 is coupled to the tool unit 50. The relay 30 is energized by a "tool present" signal from detector 28. Detector 28 is a proximity detector that may respond for example to a proximity indicator 58 located on the tool unit 50. The proximity detector 28 (and optionally the proximity indicator 58) may comprise any proximity sensor system as well known in the art, for example a magnet 58 and read switch or Hall Effect sensor 28; an optical emitter 58 and receiver 28; a high-density element 58 and ultrasonic range finder 28; or the like. Upon detecting the presence of the tool unit 50 (indicating that master unit 20 and tool unit 50 are coupled together), the proximity detector 28 energizes the relay 30. This causes the relay 30 to switch to its normally-open position, opening the circuit between the unlock output 26 of the controller 21 and the decouple input 23 of the coupler 22. In this state, no unlock signal generated by the controller 21 can actuate the coupler 22 without passing through the interlock switch 70, which is only closed when the tool 14 is securely positioned within the tool stand 80.

When the master unit 20 and tool unit 50 are coupled together, and the relay 30 is energized by the proximity detector 28, not only is the electrical path from the controller 21 to the coupler 22 open-circuited, but the coupler decouple input 23 is additionally routed back to the controller 21 via the normally-open contact of the relay 30. This provides a feedback signal to the controller 21 for verifying the operation of both the relay 30 and the coupler 22. Similarly, and referring to FIG. 2, when the master unit 20 and tool unit 50 are decoupled, the controller 21 will not sense the state of the decouple input 23. In this manner, the controller 21 may monitor the state of the relay 30, and by comparison with other sensors, may verify its proper operation (for example, the proximity sensor 28 may additionally send the "tool connected" signal to the controller 21; the coupler 22 may send status signals to the controller 21, and the like, none of which are depicted in FIG. 1 or 2).

Figure 3:
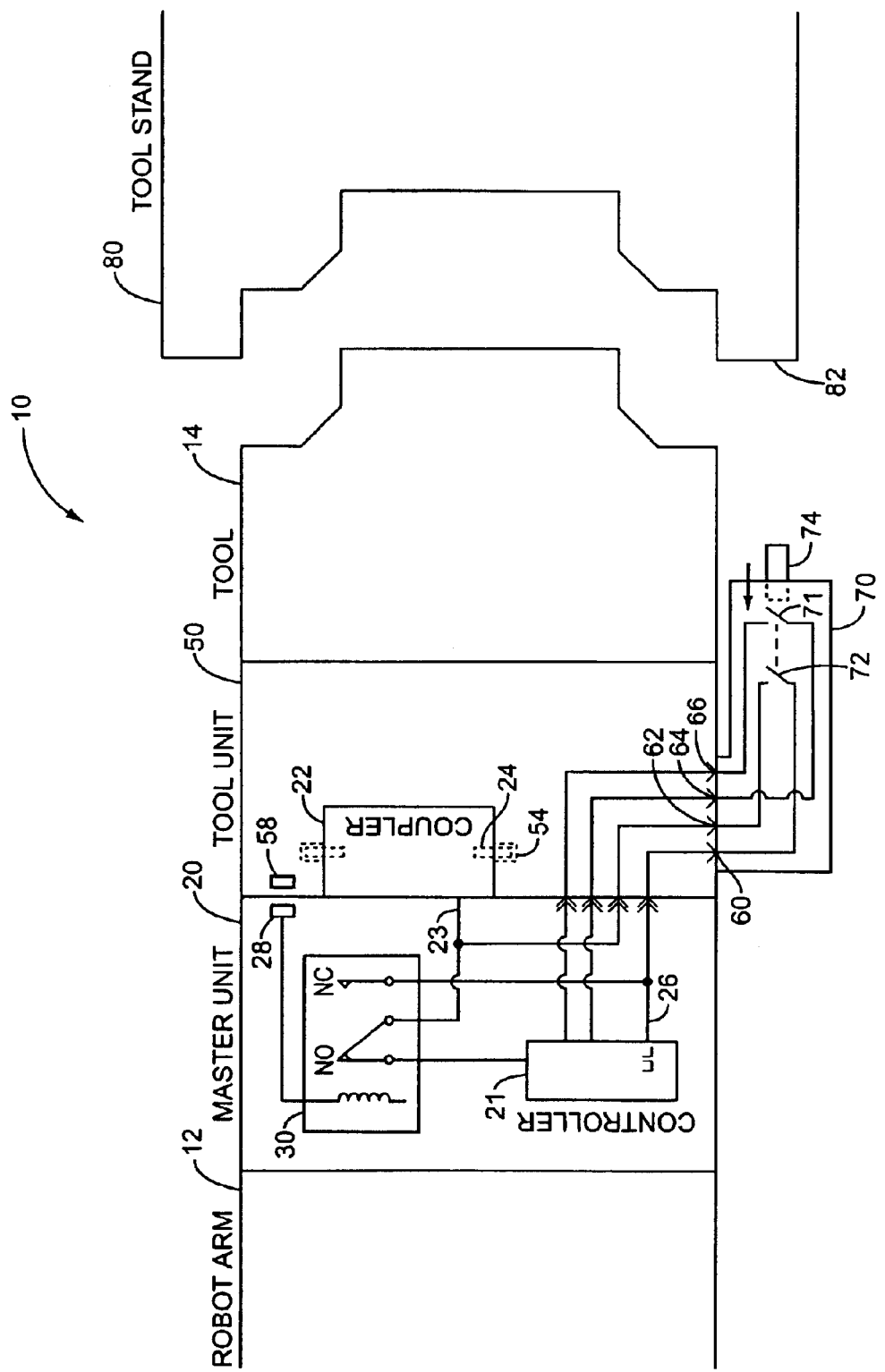
FIG. 3 is a functional block diagram of a tool changer, depicting an interlock having status feedback signals.

The interlock switch 70 may, in an exemplary embodiment, be implemented as a double pole switch, relay, pneumatic valve or other circuit that provides one or more additional feedback signals. This is depicted in FIG. 3, wherein the interlock circuits are shown as electrical signals. FIG. 3 additionally depicts the interlock switch 70 mounted to the tool unit 50 rather than the tool 14. In the double-pole switch 70, the plunger 74 or other actuator is activated by the surface 82 of the tool stand 80 when the tool 14 is securely stowed in the tool stand 80. The plunger 74 simultaneously closes switch contacts 72 and switch status indicator 71. Switch contacts 72 route the controller 21 unlock output 26 to the coupler 22 decouple input 23, as describe above and with reference to FIGS. 1 and 2. The contacts of switch status indicator 71 are routed through external switch status contacts 64, 66 (which may for example be co-located with contacts 60, 62), through the master/tool interface, and to additional feedback inputs of the controller 21. In this manner, the controller 21 may monitor the status of the interlock switch 70 independently of its effect in enabling the coupler 22. Monitoring the status of both the relay 30 and the safety interlock switch 70 is desirable due to the critical safety function performed by the interlock circuits. If switch 30 or 70 were to fail in the short-circuit position, the interlock circuit's essential function would be defeated. In this situation, the controller 21, or a system robotic controller or master program in communication with controller 21, should detect the condition and initiate a shut-down, trigger a safety-critical equipment failure flag, or take other action as appropriate.

Figure 4:
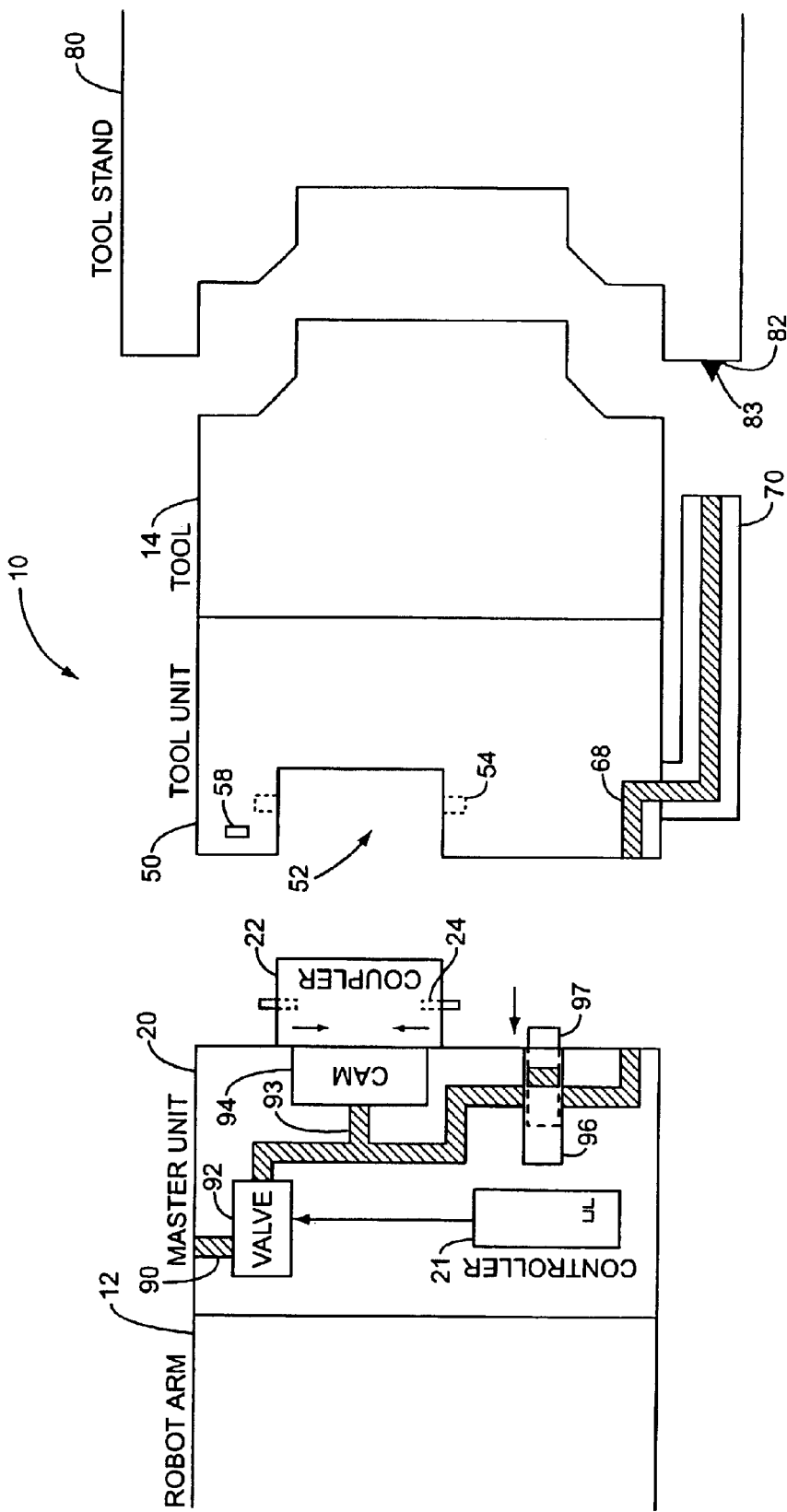
FIG. 4 is a functional block diagram of a tool changer according to the present invention, implemented with pneumatic circuits.

The present invention has been described above by reference to various embodiments that implement the interlock function via electrical circuits. The present invention, however, is not limited to an electrical circuit implementation. The interlock circuits could be pneumatic, via mechanical linkages, or in a variety of other ways, all of which fall within the scope of the present invention as claimed herein. For example, FIG. 4 depicts an embodiment wherein the interlock circuits of the present invention are implemented as pneumatic pressure lines. In general, as used herein, a "circuit" is broadly defined as an instrumentality or aggregate of instrumentalities that effect a transfer of operative control of an uncouple command from a controller 21 to a coupler 22. According to the present invention, a circuit associated with the tool unit 50 provides a tool interlock functionality such that any unlock command generated by the controller 21 is effectively conveyed to the coupler 22 when the master unit 20 and tool unit 50 are decoupled, and only if the tool 14 is stored in a tool stand 80 when the master unit 20 and tool unit 50 are coupled together.

With reference to FIG. 4, master unit 20 includes air inlet 90 connected to a source of pneumatic pressure (not shown). Pneumatic pressure at the pneumatic circuit 93 actuates a cam 94, which in turn causes the coupler 22 to assume a decoupled position. The coupler 22 is biased to a coupled position, which it assumes in the absence of pneumatic pressure at the cam 94. The application of pneumatic pressure to the cam 94 is controlled by a valve 92 connected to the air input 90. The valve 92 operates under the control of the controller 22 (which may be via an electrical signal, or other means as appropriate). The pneumatic circuit 93 exits the master unit 20 at normally-closed valve switch 96. Valve switch 96 is biased to a closed position, in which pneumatic pressure is not transferred across it. Valve switch 96 is operated by an actuator 97, biased to an extended position. When the actuator 97 is moved to a retracted position, such as by contact with the tool unit 50, the valve switch 96 opens, allowing pneumatic pressure to flow across the switch 96 and into the pneumatic circuit 68 of tool unit 50. Pneumatic pressure is carried by circuit 68 associated with the tool unit 50, and through a safety interlock 70. Disposed on mating surface 82 of the tool stand 80 is a plug 83, positioned to mate with the pneumatic circuit in the interlock switch 70.

In operation, when the master unit 20 and tool unit 50 are uncoupled, the coupler 22 may assume the uncoupled position upon command by the controller 21. Pneumatic pressure supplied by air input 90 and passing through valve 92 is trapped at the closed valve switch 96, proving pressure to actuate the cam 94 and uncouple the coupler 22 in preparation for mating with a tool unit 50.

Once the master unit 20 and tool unit 50 are coupled together, however, the valve switch 96 is forced open by the actuator 97 moving to the retracted position due to contact with the tool unit 50. This bleeds off all pneumatic pressure in the pneumatic circuit 93 and prevents actuation of the cam 94, hence preventing the coupler 22 from assuming the uncoupled position (even if the controller 21 opens the valve 92 to uncouple the coupler 22). Only when the tool 14 is securely mated in the tool stand 80, and the plug 83 mated to the interlock switch 70, is the pneumatic circuit 68 of tool unit 50 closed, allowing pressure in the pneumatic circuit 93 of master unit 20 to build up and actuate the cam 94 to uncouple the coupler 22. The various elements of the pneumatic interlock circuits of the embodiment of the present invention depicted in FIG. 4 may, in practice, include various sensors and monitors as necessary or desired to provide appropriate feedback to the controller 21 or external controller or master program as prudent safety concerns may dictate. Note that the elements depicted in FIG. 4 and described herein are idealized schematic/functional block, and are not intended to represent an actual implementation.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A robot tool changer comprising:
   a master unit;
   a tool unit;
   a coupler selectively movable between coupled and decoupled positions and operative to couple said master and tool units together by moving the coupler to the coupled position;
   an electrical circuit for actuating said coupler, including:
      at least two contacts associated with said tool unit and operative to enable said coupler to assume said decoupled position when said contacts are electrically connected to each other; and
      a first switch operative to enable said coupler to assume said decoupled position only when said master unit is decoupled from said tool unit.

2. The tool changer of claim 1 wherein said contacts are connected to a second switch associated with a tool connected to said tool unit, said second switch being rendered electrically conductive by proximity to a tool stand when said tool is located in the tool stand.

3. The tool changer of claim 2 further comprising at least one switch status contact associated with said tool unit.

4. The tool changer of claim 3 wherein said second switch includes a switch status indicator, and wherein said switch status indicator is connected to said at least one switch status contact.

5. The tool changer of claim 1 wherein said first switch includes a switch status indicator.

6. The tool changer of claim 1 further comprising a controller operative to energize said electrical circuit to actuate said coupler to the decoupled position.

7. The tool changer of claim 6 wherein, when energized by said controller, said electrical circuit actuates said coupler to the decoupled position only when either said first or second switch is closed.

8. The tool changer of claim 7 wherein said controller is a DeviceNet controller.

9. The tool changer of claim 1 further comprising a sensor operative to detect when said master and tool units are coupled.

10. The tool changer of claim 9 wherein said sensor is operative to open said first switch when said master and tool units are coupled.

11. A method of safely decoupling a tool unit from a master unit of a robot tool changer, said tool changer including a coupler selectively movable between coupled and decoupled positions and operative to couple said master and tool units together by moving the coupler to the coupled position, comprising:
- sensing whether a tool connected to said tool unit is located in a tool stand;
- sensing whether said master unit and said tool unit are coupled together; and
- moving said coupler to said decoupling position only when either
    - said master and tool unit are coupled together and said tool is located in a tool stand; or
    - said master and tool unit are decoupled from each other.

12. The method of claim 11 further comprising sensing the status of switches in an electrical circuit operative to move said coupler to said decoupling position.

13. The method of claim 11 wherein sensing whether a tool connected to said tool unit is located in a tool stand comprises sensing the state of electrical contacts associated with said tool unit.

14. A robot tool changer comprising:
- a master unit;
- a tool unit;
- a coupler selectively movable between coupled and decoupled positions and operative to couple said master and tool units together by moving the coupler to the coupled position;
- a first circuit associated with said tool unit;
- a second circuit associated with said master unit;
- said first and second circuits being connected when said master unit is coupled to said tool unit;
- wherein said first circuit is operative to enable the coupler to selectively move between said coupled and decoupled positions when said master unit and tool unit are coupled together; and
- wherein said second circuit is operative to enable the coupler to selectively move between said coupled and decoupled positions when said master unit and tool unit are decoupled from each other.

15. The robotic tool changer of claim 14 wherein said first circuit is operative to enable the coupler to selectively move between said coupled and decoupled positions only when said master unit and tool unit are coupled together and said second circuit is operative to enable the coupler to selectively move between said coupled and decoupled positions only when said master unit and tool unit are decoupled from each other.

16. The robot tool changer of claim 14 wherein said first circuit is an electrical circuit and includes at least two contacts and wherein when said master and tool units are coupled together, said coupler is enabled to selectively move between said coupled and decoupled positions when said contacts are electrically connected to each other.

17. The robotic tool changer of claim 16 wherein said second circuit is an electrical circuit and includes a switch that is actuated in response to said master and tool units being coupled together.

18. The robot tool changer of claim 17 wherein when said master and tool units are decoupled from each other said switch is positioned to enable the coupler to selectively move between said coupled and decoupled positions irrespective of whether said contacts are connected to each other or not, and wherein the coupling of said master unit to said tool units actuates said switch such that said coupler can only be enabled to selectively move between said coupled and decoupled positions by said contacts being electrically connected to each other.

19. The robot tool changer of claim 14 wherein said first and second circuits are pneumatic circuits and wherein when said master and tool units are coupled together, said coupler is enabled to selectively move between said coupled and decoupled positions when said first circuit is plugged.

20. The robot tool changer of claim 14 wherein said first and second circuits are physically separated when said master and tool modules are decoupled from each other, and wherein said first and second circuits are connected to each other when said master and tool units are coupled together.

21. The robot tool changer of claim 16 wherein said contacts are disposed on the tool unit.

22. The robot tool changer of claim 17 wherein said coupler normally assumes a coupled position and wherein said robotic tool changer includes a controller operatively connected said switch for directing an uncoupling signal to said switch.

23. A robot tool changer comprising:
- a master unit;
- a tool unit;
- a coupler movable between coupled and decoupled positions and operative to couple said master and tool units together by moving the coupler to the coupled position;
- a control circuit for selectively controlling the transmission of a control signal to the coupler, the control circuit including:
    - a first circuit associated with the tool unit and including at least two contacts;
    - a second circuit including a switch operative to receive the control signal and movable between first and second positions;
    - the first and second circuits being electrically connected to each other as a result of the master and tool units being coupled together;
    - said switch assuming a first position when the master and tool units are decoupled from each other such that the control signal is directed to the coupler;
    - said switch assuming a second position in response to the master and tool units being coupled together;
    - and wherein when said switch assumes the second position the control signal is directed to the coupler only if the contacts are electrically connected to each other.

24. The robot tool changer of claim 23 including a controller for directing the control signal to the switch.

25. The robot tool changer of claim 24 wherein the controller includes an input, and wherein when said switch is in the second position, the control signal is directed to said input.

26. The robot tool changer of claim 23 wherein the contacts are connected to a switch associated with a tool.

27. The robot tool changer of claim 23 including a sensor for sensing the coupling of the master and tool units together and for causing the switch to assume the second position.

28. A method of controlling the decoupling of a robot tool changer having a master unit, tool unit, coupler and at least two contacts disposed on the tool unit, comprising:

sensing when the tool unit is decoupled from the master unit and permitting the coupler to be actuated such that the coupler may be moved from a coupled position to a decoupled position; and sensing when the tool unit is coupled to the master unit, and permitting the coupler to move from the coupled position to the decoupled position only when the contacts are electrically connected to each other.

29. The method of claim 28 wherein the coupler normally assumes a coupled position and wherein the method includes enabling a control signal to be directed to the coupler when the tool unit is decoupled from the master unit; and when the tool unit is coupled to the master unit, enabling the control signal to be directed to the coupler only when the contacts are electrically connected to each other.

* * * * *

UNITED STATES PATENT AND TRADEMARK OFFICE
CERTIFICATE OF CORRECTION

PATENT NO. : 6,840,895 B2
DATED : March 12, 2003
INVENTOR(S) : Perry et al.

It is certified that error appears in the above-identified patent and that said Letters Patent is hereby corrected as shown below:

Column 1,
Lines 7-8, "moden" should read -- modern --

Signed and Sealed this

Seventeenth Day of May, 2005

JON W. DUDAS
*Director of the United States Patent and Trademark Office*